United States Patent [19]
Oudet et al.

[11] Patent Number: 6,028,499
[45] Date of Patent: *Feb. 22, 2000

[54] MONOPHASE, SHORT TRAVEL, ELECTROMAGNETIC ACTUATOR HAVING A GOOD ELECTRIC POWER/FORCE RATIO

[75] Inventors: Claude Oudet, Besancon; Pierre Gandel, Montfocon, both of France

[73] Assignee: Moving Magnet Technologies S.A., Besancon, France

[*] Notice: This patent issued on a continued prosecution application filed under 37 CFR 1.53(d), and is subject to the twenty year patent term provisions of 35 U.S.C. 154(a)(2).

[21] Appl. No.: 08/545,572

[22] PCT Filed: May 16, 1994

[86] PCT No.: PCT/FR94/00579

§ 371 Date: Feb. 15, 1996

§ 102(e) Date: Feb. 15, 1996

[87] PCT Pub. No.: WO94/27303

PCT Pub. Date: Nov. 24, 1994

[30] Foreign Application Priority Data

May 19, 1993 [FR] France ................................ 93 06073

[51] Int. Cl.[7] ..................................................... H01F 7/08
[52] U.S. Cl. .......................... 335/220; 335/229; 335/230; 335/234; 335/274; 335/281
[58] Field of Search ............................ 335/220, 229–234, 335/274, 281; 310/15, 28, 30

[56] References Cited

U.S. PATENT DOCUMENTS

| | | | |
|---|---|---|---|
| 4,563,664 | 1/1986 | Chin et al. | 335/274 |
| 4,604,599 | 8/1986 | Koehler | 335/230 |
| 4,682,135 | 7/1987 | Yamakawa | 335/256 |
| 4,703,297 | 10/1987 | Nagasaka | 335/222 |
| 4,751,487 | 6/1988 | Green, Jr. | 335/234 |
| 4,779,582 | 10/1988 | Lequesne | 123/90.11 |
| 4,859,975 | 8/1989 | Uetsuhara | 335/230 |
| 4,928,028 | 5/1990 | Leibovich | 310/23 |
| 4,985,652 | 1/1991 | Oudet et al. | 310/15 |
| 5,136,194 | 8/1992 | Oudet et al. | 310/15 |
| 5,298,825 | 3/1994 | Oudet et al. | 310/156 |

FOREIGN PATENT DOCUMENTS

| | | |
|---|---|---|
| 15783 | 9/1980 | European Pat. Off. . |
| 0157632 | 10/1985 | European Pat. Off. . |
| 3008534 | 9/1980 | Germany . |
| 59006503 | 1/1984 | Japan . |
| 20 39150 | 7/1980 | United Kingdom . |

*Primary Examiner*—Michael L. Gellner
*Assistant Examiner*—Raymond Barrera
*Attorney, Agent, or Firm*—Oblon, Spivak, McClelland, Maier & Neustadt, P.C.

[57] ABSTRACT

A monophase electromagnetic actuator including at least a ferromagnetic part integral with a member movable along a direction Y, a fixed stator part made of soft magnetic material and including at least on electrical coil, and a thin transversely magnetized permanent magnet. The fixed stator part and the ferromagnetic part define between each other at least two air gaps arranged symmetrically with respect to the medial plane perpendicular to the axis of displacement of the movable member and passing through the middle of the permanent magnet. The length of the ferromagnetic part is approximately equal to the length of the permanent magnet.

10 Claims, 3 Drawing Sheets

MONOPHASE, SHORT TRAVEL, ELECTROMAGNETIC ACTUATOR HAVING A GOOD ELECTRIC POWER/FORCE RATIO

BACKGROUND OF THE INVENTION

1. Field of the Invention

The present invention concerns a single-phase electromagnetic actuator, designed more particularly for applications requiring low-amplitude strokes.

2. Discussion of the Art

Actuators are known in the state of the art that include a first part moving along a direction Y and a second, fixed stator part made of a material with a very high magnetic permeability that contains at least one coil. Such actuators are, for example, claimed in the applicant's French Patent No. 2,648,633. The actuator, according to this embodiment, includes a transversely magnetized thin magnet with the peculiarity of providing a constant force throughout the entire stroke and an absence of magnetostatic force.

Also known from the prior art are actuators described, for example, in European Patent No. 157,632 or U.S. Pat. No. 4,779,582. These actuators contain two electrical coils acting antagonistically on a movable unit containing a thick-walled permanent magnet.

Such devices of the prior art present the disadvantages of the law of nonlinear force in relation to the current injected into the coils, a large amount of occupied space in the radial direction and a low efficiency in force per watt.

SUMMARY OF THE INVENTION

The purpose of the present invention is to provide an actuator optimized for short strokes and to provide an actuator that presents a high level of force per watt.

To this end, the actuator according to the invention has a fixed stator part and a movable ferromagnetic part defining between them two gaps arranged symmetrically with respect to the median plane perpendicular to the movement axis Y of the radially magnetized movable unit which passes through the middle of a permanent magnet, with the length of the movable ferromagnetic part approximately equal to the length of the permanent magnet. The radial gap between the fixed magnet and the ferromagnetic part is made as short as mechanically possible.

When the movable ferromagnetic part is in a median position with respect to the magnet and to the fixed stator part, the magnetic flux due to the magnet is shared equally between both gaps in the absence of a current in the excitation coil.

When current circulates through the excitation coil, it creates flux that is added to or subtracted from that of the permanent magnet. According to the direction of the flux generated by the coil, it will close preferentially in one or the other of the gaps, which causes the movable ferromagnetic part to move in the direction of the gap crossed by the addition of the two fluxes.

This type of actuator presents the particularity of producing a large magnetostatic force in each one of the two stable positions without current at the end of the stroke. In order to reduce the proportion of magnetostatic force in relation to the force due to the current, the gaps may be advantageously tilted with respect to axis Y by an angle on the order of 45°.

According to a preferred variation, the fixed stator part consists of an external cylindrical tube made of a soft magnetic material, which is closed at each end by a flange made of the same material with a conical surface. Advantageously, the coil is housed in the external cylinder and the fixed magnet is housed within the internal diameter of the coil; it preferably consists of a high-energy, radially oriented magnet such as those offered by the company DAIDO STEEL Ltd. The movable magnetic part consists of a tubular part made of a soft magnetic material with a conical surface at each end which complements that of the fixed stator part.

Advantageously, the coil is housed in a cylindrical cavity provided in the fixed stator part.

According to one variation, the actuator has two annular coils arranged symmetrically with respect to the median crosswise plane, housed in cylindrical cavities provided in the fixed stator part. This embodiment makes it possible to use the actuator bidirectionally in single-pole control and makes it possible to insert a soft magnetic material between the two coils to facilitate closing the magnetic flux between the magnet and the external cylinder, rather than through the thickness of the coil's copper.

According to one preferred embodiment, the actuator has two springs exerting at each end of the movable unit a repelling force oriented along the Y axis and designed to compensate for the natural magnetostatic force of this structure. Thanks to this method, a approximately constant force over the entire stroke of the actuator is achieved.

According to one particular variation, the actuator has a second movable ferromagnetic part coaxial with the first movable ferromagnetic part. This embodiment makes it possible to arrange both movable units in opposite directions.

Preferably, the magnet is fixed and, according to a particular variation, the radially oriented cylindrical magnet is replaced by 3 tiles that form sections of approximately 120°, or by a series of thin rectangular magnets distributed regularly on a diameter.

BRIEF DESCRIPTION OF THE DRAWINGS

The invention will be better understood by reading the following description which makes reference to the attached drawings in which.

DESCRIPTION OF THE PREFERRED EMBODIMENTS

Figure 1:
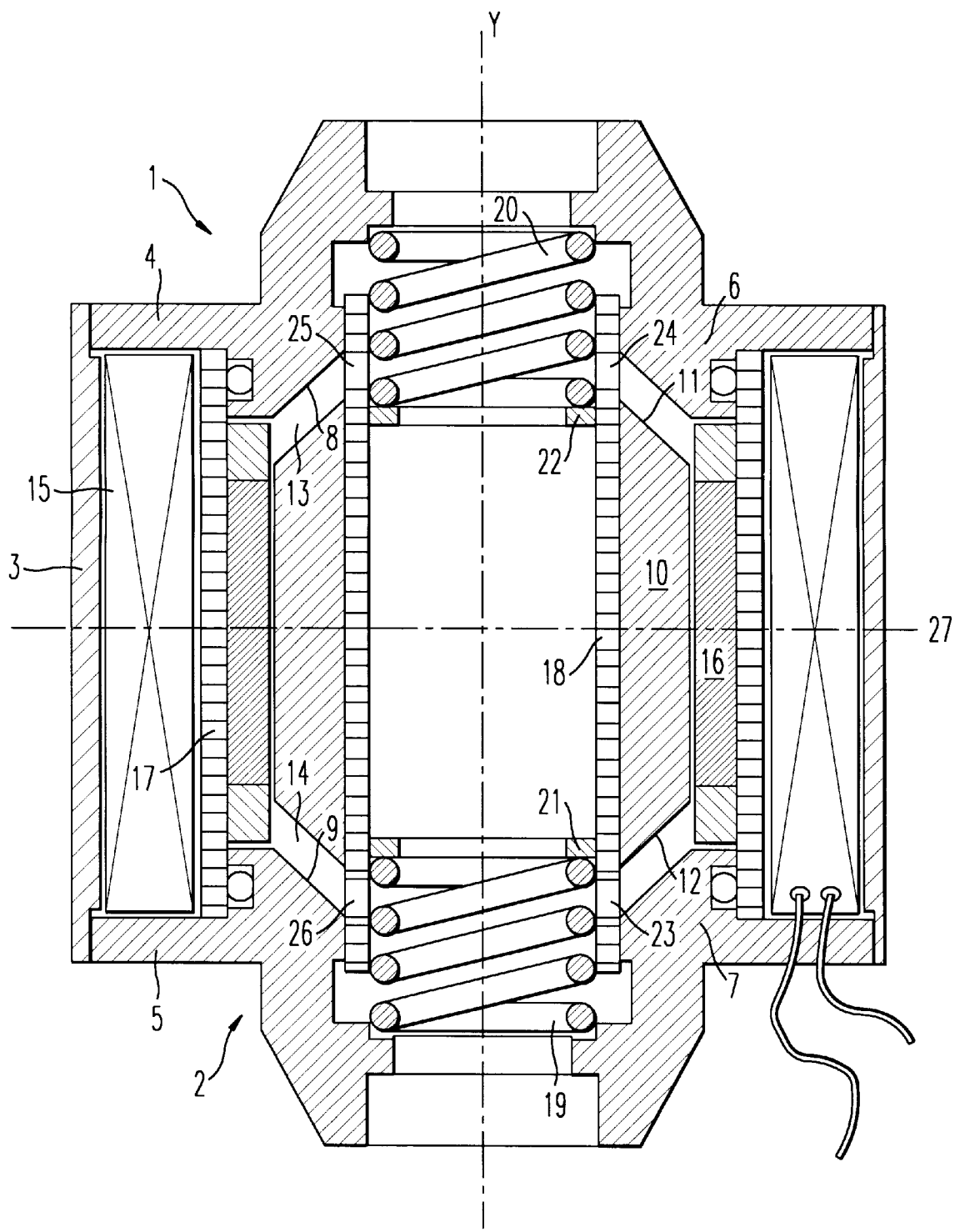
FIG. 1 presents a cross section in 2:1 scale of an actuator according to the invention.

The actuator represented by way of a nonlimiting example in FIG. 1 contains a fixed stator part consisting of two cylindrical parts (1, 2) joined by a tubular closing piece (3), with all three coaxial parts made of a soft magnetic material.

The cylindrical parts (1, 2) present a front part respectively (4, 5) in an annular shape and an internal part respectively (6, 7) presenting a conical surface (8, 9). The length of the closing piece (3) is 37 mm, in the described embodiment example, and the external diameter of the fixed stator part is 45 mm.

The movable ferromagnetic part (10) is created by a tubular part made of a soft magnetic material presenting at its two front ends (11, 12) conical surfaces defining with the conical surfaces (8, 9) of the fixed stator part two annular gaps (13, 14). The width of the gap, measured in the Y direction of movement of the movable ferromagnetic part, is 1 mm.

The actuator contains an annular coil (15) consisting of a winding of copper wire. This coil (15) is housed in a cylindrical cavity of the fixed stator part and, when current flows through in the aforementioned coil, causes the conduction of magnetic flux conducted by the closure part (3), the first gap (13), the movable stator part (10), and the second gap (14).

The permanent magnet (16) consists of a radially magnetized tubular part. It is fastened to an insulation part (17) which seals the cavity in which the electric coil (15) is housed. This insulation part is made of plastic.

Figure 4:
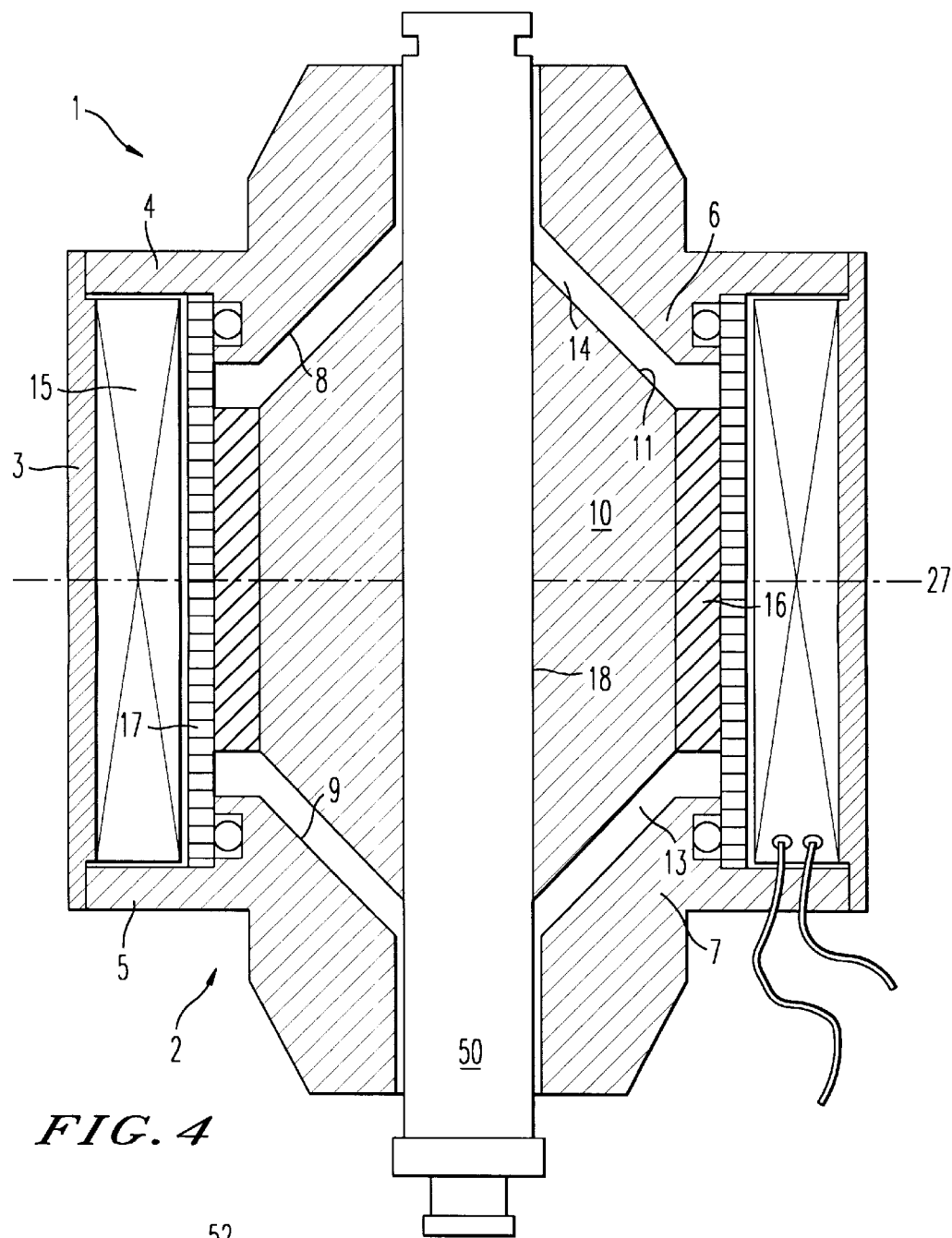
FIG. 4 presents a view of an actuator according to a second variant.

The movable ferromagnetic part (10) is an integral part of a movable unit (18) with a tubular shape for coupling with an external means, for example, the tip of a valve, or, in the embodiment represented in FIG. 4, a high-frequency contact blade.

The movable unit (18) is taken to the median rest position by two springs (19, 20) acting on shoulders respectively (21, 22) provided inside the movable unit (18). The movable unit (18) has vents (23 through 26) to prevent the compression of air inside the gaps (13, 14).

By way of an example, an actuator according to this embodiment develops a force of 40 N with an electrical power of 6 W and for a movement of ±1 mm in relation to the median plane of symmetry (27).

Figure 2:
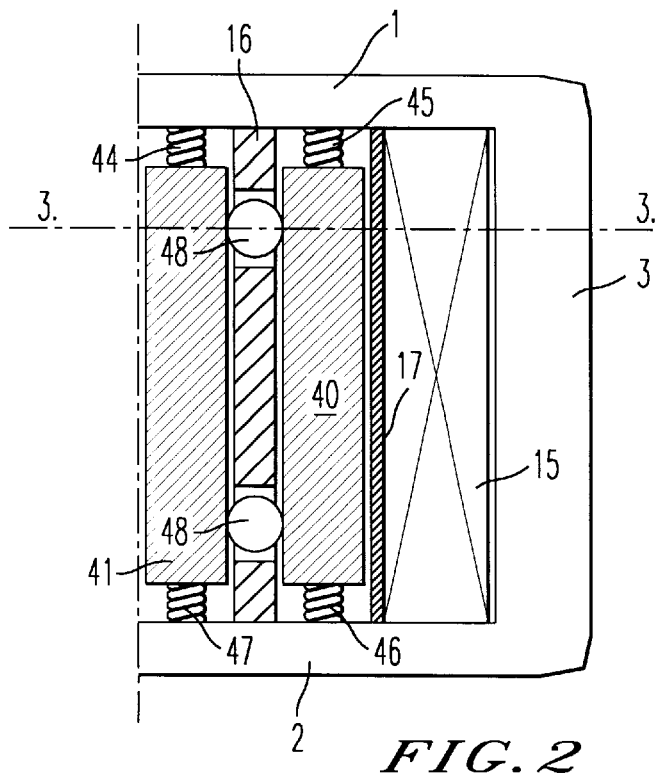
FIG. 2 presents a lengthwise cross section of an embodiment variation.
Figure 3:
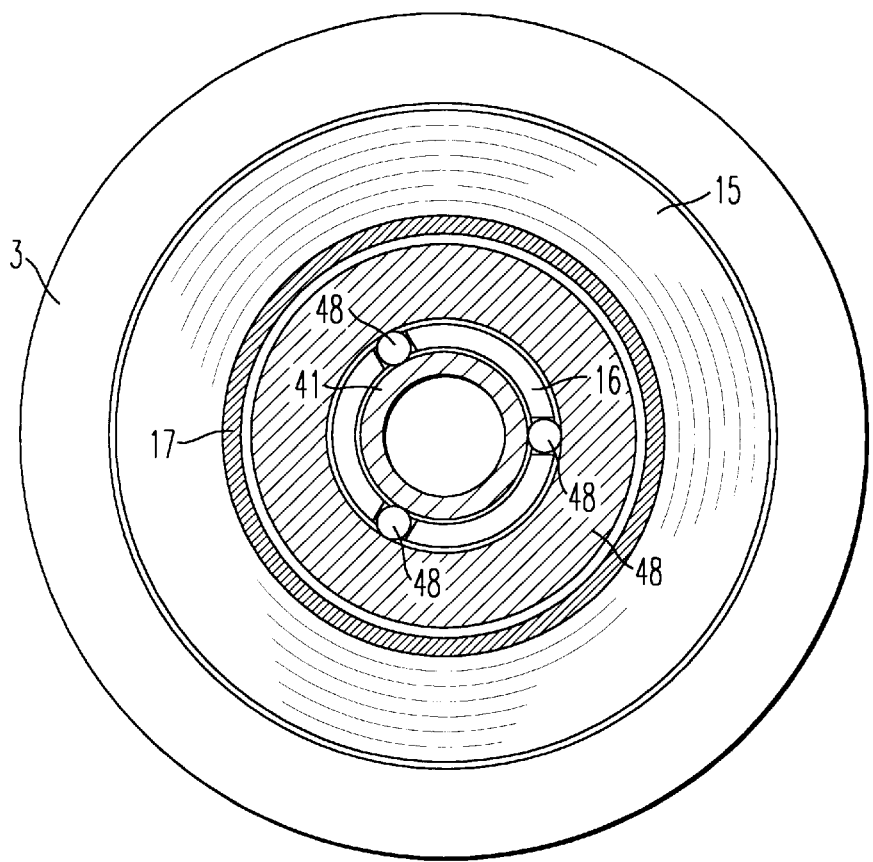
FIG. 3 presents a cross section through plane AA of this variant.

FIGS. 2 and 3 represent cross sections of an embodiment variation which implements two tubular, coaxial movable stator parts (40, 41), movable axially between the two front parts (1, 2) of the fixed stator part which defines the gaps (44 through 47).

Balls (48) are positioned in tubular housings provided in the permanent magnet (16). These balls (48) position and guide the movable stator parts (40, 41).

The flow of current through the annular coil (15) causes movement in opposite directions of the two movable stator parts (40, 41).

FIG. 4 represents a variation of the actuator presenting the general characteristics of the actuator shown in FIG. 1, the movable unit of which drives a cylindrical coupling rod (50). In the embodiment shown, there are no return springs in order to use the magnetostatic force at each end of the stroke, resulting in two stable positions in the absence of current.

Figure 5:
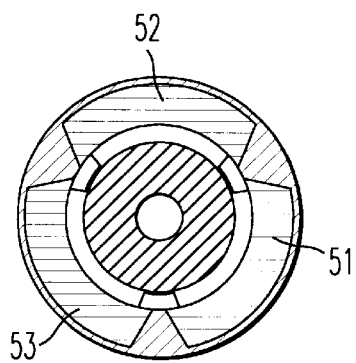
FIG. 5 presents a view of an actuator according to a third variant.

FIG. 5 shows an embodiment variation in which the permanent magnet consists of an assembly of three thin tile-shaped magnets (51, 52, 53) forming sections of approximately 120°.

Figure 6:
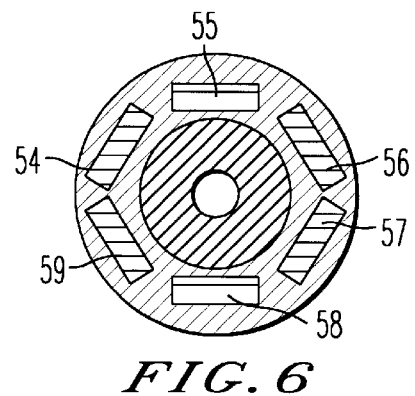
FIG. 6 presents a view of an actuator according to a fourth variant.

In the embodiment shown in FIG. 6, the permanent magnet consists of six parallelepipedal magnets (54 through 59) spaced at regular angular intervals.

The invention is described in the foregoing by way of nonlimiting examples. It is well understood that a person skilled in the art would be able to realize different variations without thereby going beyond the framework of the invention.

We claim:

1. A single-phase electromagnetic actuator comprising:
   a first moveable unit which is movable along an axis of movement and arranged synmetrically with respect to a median plane perpendicular to said axis of movement, said first movable unit integrally comprising at least one ferromagnetic part:
   a fixed stator part formed from a soft magnetic material and defining at least two gaps with respect to said at least one ferromagnetic part, said at least two gaps being arranged symmetrically with respect to said median plane;
   an electrical coil housed in at least one cavity disposed within said fixed stator part;
   a transversely magnetized thin permanent magnet arranged such that said median plane intersects a middle of said thin permanent magnet, said magnet comprising a thin radially magnetized tubular part located in the cavity in which the electrical coil is housed and inside an internal diameter of the electrical coil, wherein a direction of motion of said first movable unit corresponds to a direction of current flowing through said electrical coil, and wherein an amount of motion of said first movable unit corresponds to an amount of said current; and
   two springs, each of said springs exerting a repelling force upon a selected one of first and second ends of the first movable unit, said repelling force being oriented along the axis of movement.

2. A single-phase electromagnetic actuator comprising:
   a first moveable unit which is movable along an axis of movement and arranged symmetrically with respect to a median plane perpendicular to said axis of movement, said first movable unit integrally comprising at least one ferromagnetic part;
   a fixed stator part formed from a soft magnetic material and defining at least two gaps with respect to said at least one ferromagnetic part, said at least two gaps being arranged symmetrically with respect to said median plane, wherein said at least two gaps each form an angle with the axis of movement, said angle being between 0° and 90°;
   an electrical coil housed in at least one cavity disposed within said fixed stator part; and
   a transversely magnetized thin permanent magnet arranged such that said median plane intersects a middle of said thin permanent magnet, said magnet comprising a thin radially magnetized tubular part located in the cavity in which the electrical coil is housed and inside an internal diameter of the electrical coil, wherein a direction of motion of said first movable unit corresponds to a direction of current flowing through said electrical coil, and wherein an amount of motion of said first movable unit corresponds to an amount of said current, and wherein:
   the fixed stator part comprises two cylindrical parts formed from a soft magnetic material and joined by a tubular closure part, each of said two cylindrical parts having an annular front part extended by a center part with a conical surface;
   the first movable unit comprises a first movable tubular part formed from a soft magnetic material and having first and second ends, each of said first and second ends having a conical surface that complements a conical surface of the fixed stator part; and
   the thin tubular part of said thin permanent magnet is radially magnetized.

3. A single-phase electromagnetic actuator comprising:

a first moveable unit which is movable along an axis of movement and arranged symmetrically with respect to a median plane perpendicular to said axis of movement, said first movable unit integrally comprising at least one ferromagnetic part;

a fixed stator part formed from a soft magnetic material and defining at least two gaps with respect to said at least one ferromagnetic part, said at least two gaps being arranged symmetrically with respect to said median plane, wherein said at least two gaps each form an angle with the axis of movement, said angle being between 0° and 90°;

an electrical coil housed in at least one cavity disposed within said fixed stator part;

a transversely magnetized thin permanent magnet arranged such that said median plane intersects a middle of said thin permanent magnet, said magnet comprising a thin radially magnetized tubular part located in the cavity in which the electrical coil is housed and inside an internal diameter of the electrical coil, wherein a direction of motion of said first movable unit corresponds to a direction of current flowing through said electrical coil, and wherein an amount of motion of said first movable unit corresponds to an amount of said current; and two springs, each of said springs exerting a repelling force upon a selected one of first and second ends of the first movable unit, said repelling force being oriented along the axis of movement.

4. A single-phase electromagnetic actuator comprising:

a first moveable unit which is movable along an axis of movement and arranged symmetricall with respect to a median plane perpendicular to said axis of movement, said first movable unit integrally comprising at least one ferromagnetic part;

a fixed stator part formed from a soft magnetic material and defining at least two gaps with respect to said at least one ferromagnetic part, said at least two gaps being arranged symmetrically with respect to said median plane;

an electrical coil housed in at least one cavity disposed within said fixed stator part; and a transversely magnetized thin permanent magnet arranged such that said median plane intersects a middle of said thin permanent magnet, said magnet comprising a thin radially magnetized tubular part located in the cavity in which the electrical coil is housed and inside an internal diameter of the electrical coil, wherein a direction of motion of said first movable unit corresponds to a direction of current flowing through said electrical coil, wherein an amount of motion of said first movable unit corresponds to an amount of said current, and wherein:

the fixed stator part comprises two cylindrical parts formed from a soft magnetic material and joined by a tubular closure part, each of said two cylindrical parts having an annular front part extended by a center part with a conical surface;

the first movable unit comprises a first movable tubular part formed from a soft magnetic material and having first and second ends, each of said first and second ends having a conical surface that complements a conical surface of the fixed stator part; and the thin tubular part of said thin permanent magnet is radially magnetized.

5. A single-phase electromagnetic actuator according to claim 4, further comprising two springs, each of said springs exerting a repelling force upon a selected one of first and second ends of the first movable unit, said repelling force being oriented along the axis of movement.

6. A single-phase electromagnetic actuator according to claim 4, wherein said electrical coil is symmetrically arranged in relation to the median plane and housed in at least one cylindrical cavity within the fixed stator part.

7. A single-phase electromagnetic actuator according to claim 6, further comprising two springs, each of said springs exerting a repelling force upon a selected one of first and second ends of the first movable unit, said repelling force being oriented along the axis of movement.

8. A single-phase electromagnetic actuator according to claim 4, wherein said electrical coil is housed in at least one cylindrical cavity within the fixed stator part.

9. A single-phase electromagnetic actuator according to claim 8, wherein said electrical coil is symmetrically arranged in relation to the median plane.

10. A single-phase electromagnetic actuator according to claim 8, further comprising two springs, each of said springs exerting a repelling force upon a selected one of first and second ends of the first movable unit, said repelling force being oriented along the axis of movement.

* * * * *